United States Patent [19]
Hiroyuki

[11] Patent Number: 4,719,344
[45] Date of Patent: Jan. 12, 1988

[54] METHOD OF AND APPARATUS FOR MEASURING AMOUNT OF SOLAR RADIATION RECEIVED DIRECTLY

[75] Inventor: Tozawa Hiroyuki, Tokyo, Japan
[73] Assignee: Eko Instruments Trading Co., Ltd., Tokyo, Japan
[21] Appl. No.: 898,883
[22] Filed: Aug. 21, 1986

Related U.S. Application Data

[63] Continuation of Ser. No. 532,738, Sep. 15, 1983, abandoned.

[30] Foreign Application Priority Data

Sep. 17, 1982 [JP] Japan ................... 57-162049

[51] Int. Cl.$^4$ .............................................. G01J 1/00
[52] U.S. Cl. .................... 250/203 R; 356/226
[58] Field of Search ............... 250/203 R, 203 S, 206, 250/214 R; 126/424, 425; 356/226, 437

[56] References Cited

U.S. PATENT DOCUMENTS 4,262,195 4/1981 White et al. .................... 250/203 S
4,491,727 1/1985 Appelbaum et al. ........... 250/203 R Primary Examiner—Edward P. Westin
Attorney, Agent, or Firm—Brumbaugh, Graves, Donohue & Raymond

[57] ABSTRACT

A method for measuring the amount of direct solar radiation and an apparatus according to the method. The invention provides a light sensor which rotates at a constant speed while scanning the sky including the sun. The differential coefficient of the radiation received is obtained from the output of the light-receiving element, thus substantially eliminating the scattered light component from the output. The preferred embodiment of the light-receiving element is a pyroelectric detector.

2 Claims, 4 Drawing Figures

METHOD OF AND APPARATUS FOR MEASURING AMOUNT OF SOLAR RADIATION RECEIVED DIRECTLY

This application is a continuation of application Ser. No. 532,738, filed on Sept. 15, 1983, now abandoned.

BACKGROUND OF THE INVENTION

This invention relates to new and improved methods and apparatus for measuring solar radiation in a simple and highly effective manner.

DESCRIPTION OF THE RELATED ART

Known methods for measuring the amount of directly-received solar radiation fall broadly into two types, namely, a method in which the amount of directly-received solar radiation is measured accurately by automatically following the sun by means of a follow-up mechanism aimed at the solar orbit, and a simplified method making use of a pyhrheliometer of the intermittent measuring type shown, for example, in Japanese Patent Publication No. 003025/1982. The first-mentioned method, however, employs an expensive follow-up mechanism and requires a manual correction for deviation due to change in the declination once every two or three days, imposing a serious problem in the operation. On the other hand, the second mentioned method is subject to errors caused by deviations between the actual amount of solar radiation directly received and the output from the pyrheliometer, particularly when the amount of solar radition is comparatively small.

FIG. 1 is illustrative of the correlation (deviation) between the output from a rotary reflecting type pyrheliometer of the type employed in the second method and the actual amount of solar radiation received directly thereby. In this figure, the linear curve is a plot of outputs accurately representative of the real or true solar radiation values such as would be obtained by the first method described above.

It will be observed that in the region around the directly-receiving radiation intensity of 100 W/m$^2$ the output from the pyrheliometer fluctuates over about 50%. This wide region of deviation or error is considered to be attributable mainly to the following two reasons: the deviation of the outputs represented by the symbol ⊙ to the upper side of the linear curve as viewed in FIG. 1 is considered to be attributable to the involvement of the scattered solar radiation in the measurement. On the other hand, the deviation of the outputs represented by the symbol △ to the lower side of the linear line is attributable to the fact that the light sensor, which is a solar battery, does not have constant wavelength characteristics and, hence, fails to follow the change in the wavelength characteristics which vary depending on factors such as the degree of contamination of the atmosphere, the altitude of the sun, and so forth. Which one of the above-mentioned two factors is responsible for the deviation of the outputs represented by the small dots . is not clear.

SUMMARY OF THE INVENTION

It is an object of the present invention, accordingly, to provide an improved pyrheliometer which is free from the drawbacks of the two known methods described above.

This and other objects are attained according to the invention by providing a pyrheliometer having a sensing portion which is rotated at a constant speed to measure both the directly-received solar radiation and the scattered solar radiation, and is responsive to the differential coefficient of the received radiation, whereby the scattered radiation is substantially eliminated from the measurement. In a preferred embodiment, deviations attributable to variations in the wavelength characteristic of the light sensor are minimized by using a pyroelectric detector which has no sensitivity dependency on the wavelength of the radiation received.

DESCRIPTION OF A PREFERRED EMBODIMENT

Figure 1:
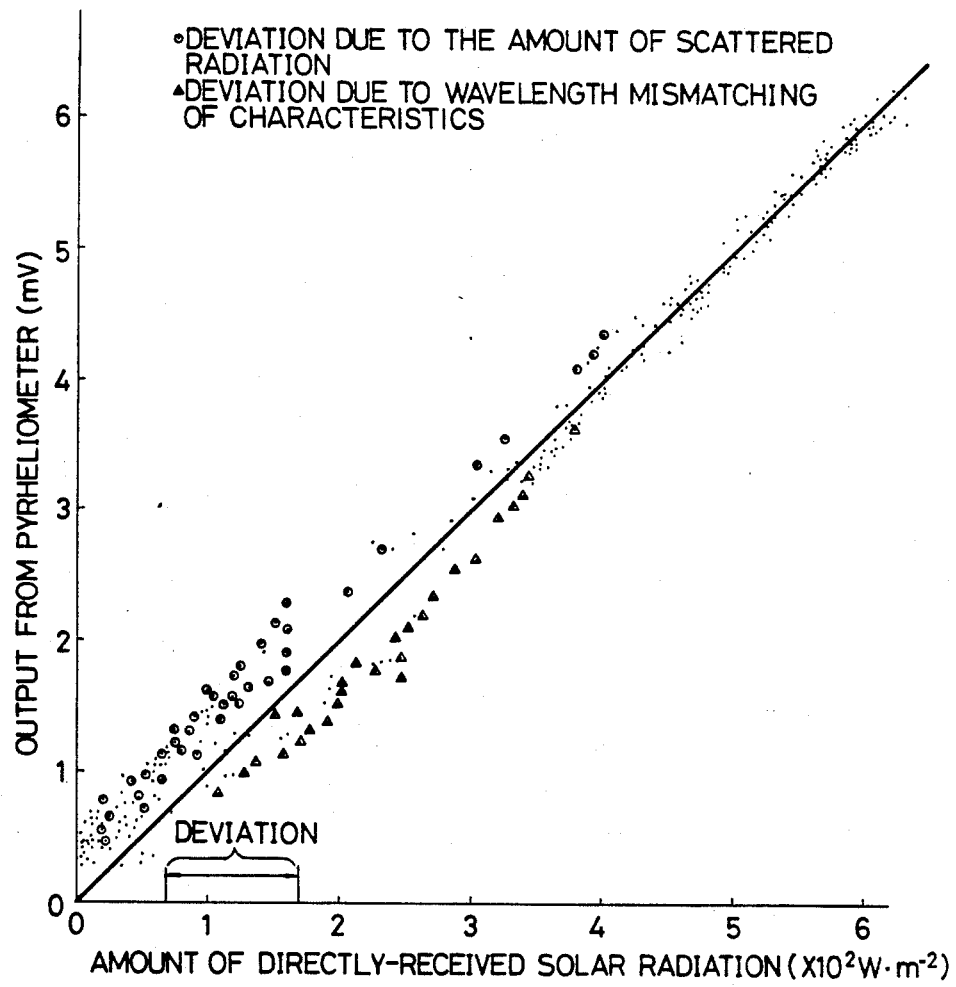
Figure 2A:
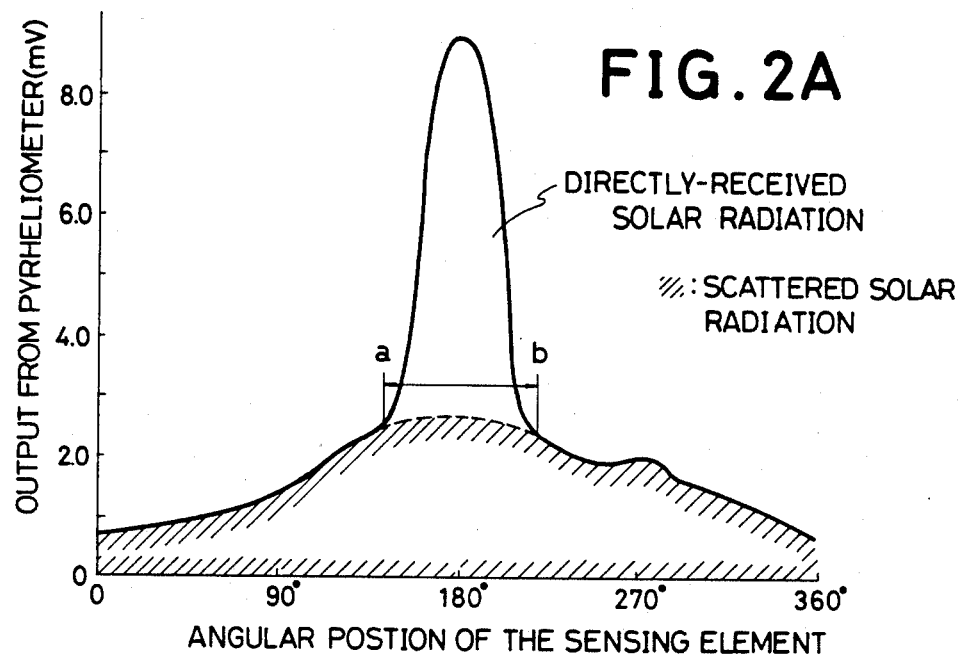
Figure 2B:
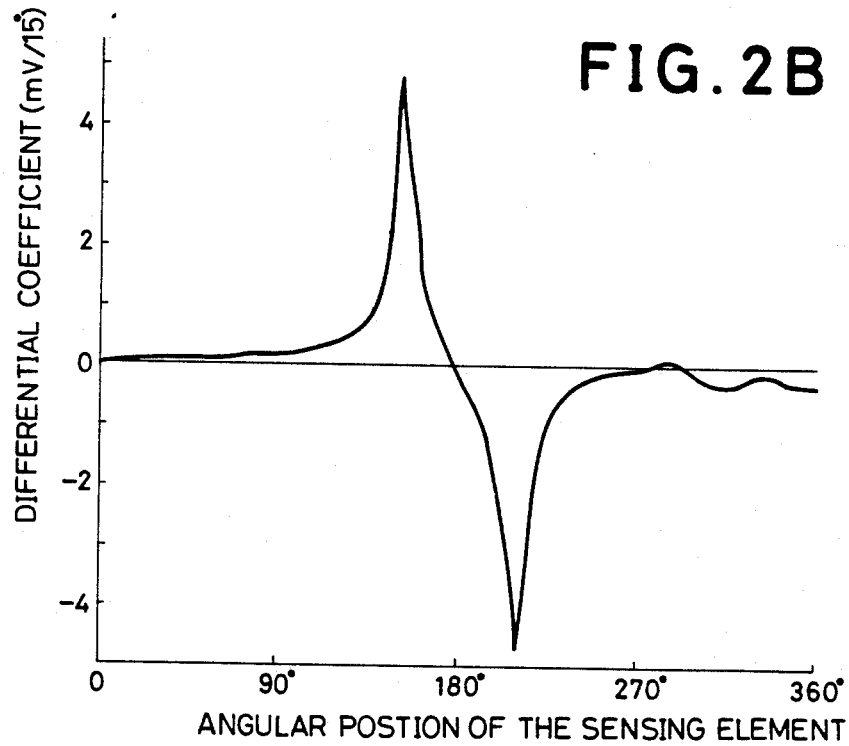
Figure 3:
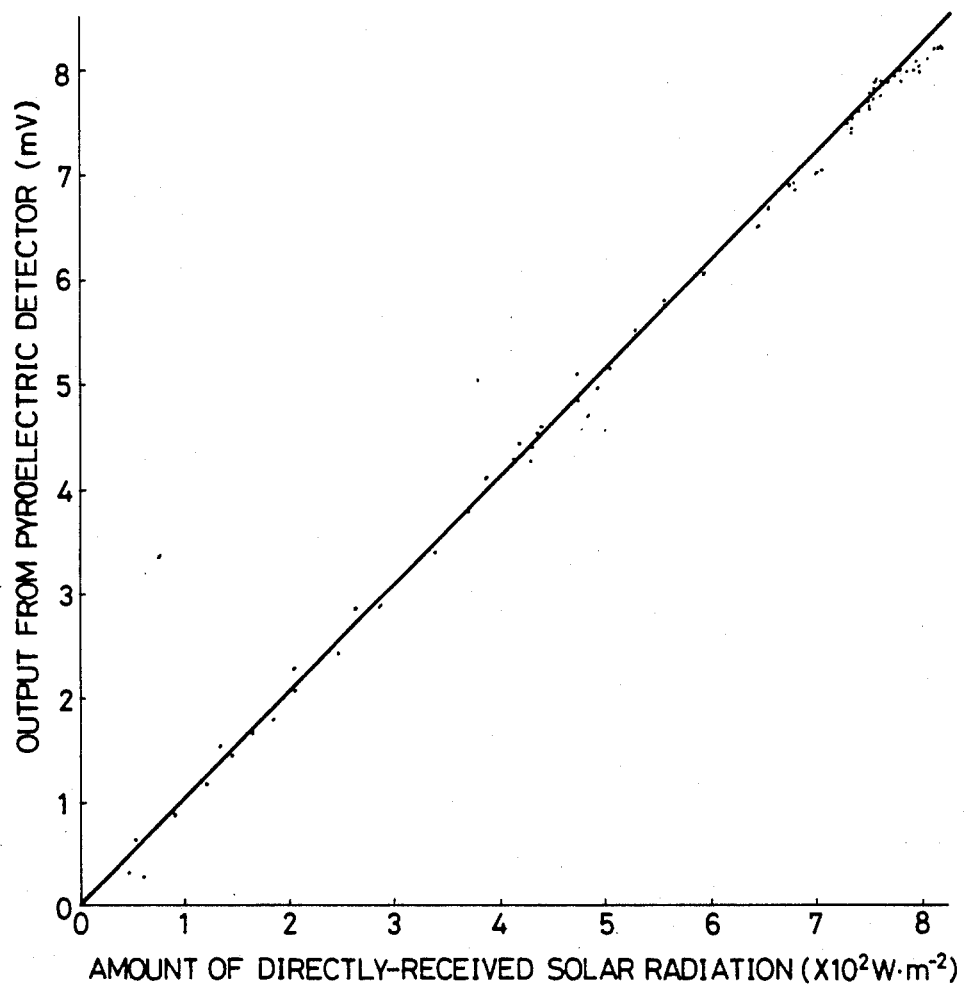

The invention can be better understood from the following detailed description taken in conjunction with the accompanying drawings, in which FIG. 1 is a graph showing the correlation between the output from a conventional rotary reflecting-type pyrheliometer and the actual amount of the directly-received solar radiation;

FIG. 2A is a graph showing the output characteristics of a pyrheliometer constructed according to the invention when rotated at a constant speed to detect the sum of the amount of the directly-received solar radiation and the amount of the scattered solar radiation;

FIG. 2B shows the correlation between the differential of the received radiation and the angular position of the sensing element of the pyrheliometer for the output shown in FIG. 2A; and FIG. 3 is a graph showing the correlation between the output from a pyroelectric detecting element in a pyrheliometer constructed according to the invention and the actual amount of the directly-received solar radiation.

FIG. 2A shows the output characteristics as obtained for a system according to the invention in which the sensing portion of the pyrheliometer is rotated at a constant speed to measure both the directly-received solar radiation and the scattered solar radiation simultaneously. The hatched area in FIG. 2A shows the output corresponding to the scattered solar radiation at every angle of rotation of the sensing element. It will be understood that in the angular range between a and b, the pyrheliometer produces an output representing the sum of the directly-received solar radiation and the scattered solar radiaion. In other words, when the sensing element is within the angular range sighting the sun, the pyrheliometer measures the sum of the amount of the directly-received solar radiation and the amount of the scattered solar radiation; whereas, in other angular ranges, the pyrheliometer measures only the amount of the scattered solar radiation. Generally, the amount of scattered solar radiation is on the order of 1/10 to 1/5 of the amount of the directly-received solar radiation, and does not change substantially over the entire celestial sphere or sensing direction. The present invention makes use of this fact in the measurement of the amount of the directly-received solar radiation.

According to the invention, the scattered radiation is substantially eliminated from the measurements by determining the differential coefficient of the output profile shown in FIG. 3 in relation to time to obtain an output profile as shown in FIG. 2B. Provided that the sensing element rotates at a constant speed, the amount of change of the differential coefficient is varied in proportion to the variation in the amount of directly-received solar radiation. FIG. 2B shows the relationship between the angular position of the sensing element of the pyrheliometer and the differential coefficient as obtained from the output pattern as shown in FIG. 2A. It will be readily understood that the deviation due to the scattered component is eliminated almost perfectly. By plotting the differential coefficient, it is possible to determine the correct amount of the directly-received solar radiation without the scattered component of the solar radiation. The differential coefficient values desired can be obtained by passing the electric output from the pyrheliometer through a known differentiating electric circuit.

In order to minimize deviations attributable to mismatching of the wavelength characteristics, the present invention contemplates the use of a thermal detector having no sensitivity dependency on the wavelength of the radiation, e.g. a pyroelectric detector. The pyroelectric detector has an operation characteristic enabling it to function as a differentiation type detector in response to the incident rays, as shown in FIG. 2A, so that the differential coefficient values are directly outputted from the detector.

FIG. 3 shows the correlation between the output from the pyroelectric detecting element in accordance with an embodiment of the invention and the actual amount of the directly-received solar radiation. From a comparison between the characteristics shown in FIG. 3 and FIG. 1, it will be understood that the method and apparatus of the invention offer a remarkable improvement in the measuring accuracy and, hence, are of great utility. The output from the pyroelectric detecting element may be picked up in the form of the sum of the differential coefficient values, or only the (+) component or the (−) component may be taken out through half-wave rectification, if desired.

By the use of a pyroelectric detector as the sensor, as has been described, it is possible according to the invention to eliminate the scattered component of the solar radiation and to obtain directly the differential coefficient which is proportional to the directly-received solar radiation, while eliminating the wavelength-dependency of the measuring characteristics. The invention thus provides a simple but effective method and apparatus for measuring the amount of directly-received solar radiation.

I claim:

1. A method for measuring the amount of direct solar radiation, comprising the steps of: rotating a light sensor at a constant speed in a manner such that the light sensor scans the sky including the sun so as to receive both direct and scattered components of solar radiation; and obtaining the differential coefficient of electric outputs from the light sensor with respect to time so as to substantially eliminate the scattered component of the radiation received.

2. A method according to claim 1, wherein the light sensor is a pyroelectric detector.

* * * * *